United States Patent [19]

Anderson et al.

[11] Patent Number: 5,200,211
[45] Date of Patent: * Apr. 6, 1993

[54] FOOD COMPOSITION COMPRISING UREA

[75] Inventors: Philip C. Anderson; Kent L. Anderson, both of Crete, Nebr.

[73] Assignee: Foodsmith Corporation, Crete, Nebr.

[*] Notice: The portion of the term of this patent subsequent to Mar. 24, 2009 has been disclaimed.

[21] Appl. No.: 855,232

[22] Filed: Mar. 23, 1992

Related U.S. Application Data

[63] Continuation of Ser. No. 567,235, Aug. 14, 1990, Pat. No. 5,098,719.

[51] Int. Cl.⁵ .............................................. A23L 1/00
[52] U.S. Cl. .......................................... 426/2; 426/69; 426/72; 426/74; 426/648; 426/656
[58] Field of Search ...................... 426/2, 69, 648, 74, 426/656, 807, 72

[56] References Cited

U.S. PATENT DOCUMENTS

| | | |
|---|---|---|
| 2,808,332 | 10/1957 | Anderson et al. |
| 3,903,158 | 9/1975 | Fuentes et al. |
| 4,211,796 | 7/1980 | Lanter et al. |
| 4,598,097 | 7/1986 | Perry et al. |
| 4,833,128 | 5/1989 | Solomon et al. |
| 5,098,719 | 3/1992 | Anderson et al. ................... 426/2 |

OTHER PUBLICATIONS

Bjorksten, "On the Knowledge of the Synthesis of Proteins and Their Building Stones in Higher Plants", Biochemische Zeitschrift (1930).

Gortner, "Outlines of Biochemistry", pp. 522-527 2d Ed (1938).

Hawley, "The Condensed Chemical Dictionary", Van Nostrand Reinhold Co., New York, 10th Edition (1982) p. 960.

Kies et al., J. Nutrition, vol, 103, No. 8, pp. 1155-1163 (1973).

Primary Examiner—R. B. Penland
Attorney, Agent, or Firm—Marshall, O'Toole, Gerstein, Murray & Bicknell

[57] ABSTRACT

The present invention provides food compositions comprising urea, sorbitol and a quantity of an edible anti-urease component effective to prevent substantial exocellular degradation of urea, and methods of using such compositions to alleviate protein malnutrition and to suppress the appetite in humans for ethanol specifically or for food generally.

8 Claims, No Drawings

FOOD COMPOSITION COMPRISING UREA

This is a continuation of copending application Ser. No. 07/567,235, filed on Aug. 14, 1990 U.S. Pat. No. 5,098,719.

BACKGROUND OF THE INVENTION

The present invention relates generally to human dietary supplements and more specifically to dietary supplements which are useful as a source of dietary nitrogen.

Daily acquisition of sufficient dietary protein of adequate quality is an essential task of all living things. Nitrogen is a critical element required for the synthesis of protein, and a tremendous amount of human work is devoted to the effort to support the biological nitrogen economy of the species. At all stages in the existence of humans, there is a continuing process of acquisition and loss of nitrogen with nitrogen balance being the difference between intake and loss of nitrogen. Growth during infancy and childhood is characterized by a strong positive nitrogen balance in which intake substantially exceeds output. Maximal negative nitrogen balance is elicited by starvation and implies loss of lean body mass through breakdown of endogenous protein. In all mammals, maintenance of appropriate nitrogen balance equilibrium is a basic biological requirement which is ultimately dependent on timely consumption of sufficient amounts of foods of suitable nutritional quality.

In humans as in other mammals, a reserve of nonprotein nitrogen is provided by urea, a compound ubiquitous in the blood of mammals. Blood urea nitrogen (BUN) is routinely measured as a critical indicator in human medicine. There ia a direct relationship between BUN and the total nitrogen balance in humans when BUN is less than about 14 mg/100 ml of blood serum.

Protein malnutrition is known to be closely related to energy malnutrition such that protein-energy malnutrition is known as a single syndrome. Ethanol (grain alcohol) is high in calories; that is, it is a rich source of dietary energy. Ethanol, however, is known to be functionally distinct from energy sources such as glucose and other carbohydrates with respect to nitrogen metabolism even though it does not itself contain nitrogen. Specifically, parenteral infusions yielding 15 cc of 98% ethanol per hour have been found to induce positive nitrogen retention despite a negative energy balance. Moreover, a strong and consistent nitrogen balance is attained with ethanol infusion if adequate energy is available from extraneous sources. Nevertheless, while ethanol is known to induce a positive nitrogen balance, there are numerous health and social concerns regarding alcohol consumption which render ethanol undesirable as an agent to promote nitrogen retention.

Industrially synthesized urea has long been recognized to be a potentially valuable source of supplementary nitrogen for the diet. For example, studies have shown that the simple addition of urea to diets deficient in "unessential" nitrogen will restore a positive nitrogen balance in human subjects. Of interest to the present application is U.S. Pat. No. 2,803,332 which discloses feed supplements for ruminants which contain urea and ethanol in amounts which increase the nitrogen retention ability of the animal. While addition of ethanol to drinking water in the amount of 1.33% ethanol with low protein rations will cause intoxication in cattle, ethanol intoxication of livestock fed the urea/ethanol supplement of U.S. Pat. No. 2,803,332 has not been reported.

The widespread use of urea as a source of human dietary nitrogen has been prevented by the hazards of the "urea toxicity syndrome" as well as by the general unavailability of sufficiently pure edible urea which is free of the toxic contaminant biuret. A further problem with the use of urea as a human dietary supplement relates to the inefficiency with which the non-protein urea nitrogen may be converted to protein in vivo. In other words, the biological value of urea per se may be relatively low compared to usual dietary sources of protein. In general, urea nitrogen is not retained when dietary protein is otherwise available. This situation changes when dietary protein is deficient, indicating the role of urea as a "reserve" source of nitrogen for amino acid (and hence protein) synthesis.

SUMMARY OF THE INVENTION

The present invention relates to food compositions comprising the combination of urea, sorbitol and an edible anti-urease component. Such food compositions can help alleviate protein malnutrition and have been found, when consumed by individuals, to provide a sensation of satiety and to suppress the appetite for food generally and for ethanol and beverages which contain ethanol specifically. Accordingly, the invention provides a method for alleviating protein malnutrition in humans comprising administering an effective amount of a food composition comprising urea, sorbitol and an edible anti-urease component. Also provided are methods for suppressing the appetite generally and the appetite for ethanol in particular in humans comprising administering an effective amount of the food composition.

DETAILED DESCRIPTION

The food compositions of the present invention comprise the combination of urea, sorbitol and an effective amount of an edible anti-urease component. Urea used in the compositions of the invention should be pure and free of impurities such as biuret, a urea decomposition product which readily forms when aqueous urea solutions or molten urea is heated. Biuret may be removed from urea by using ion-exchange techniques such as described in U.S. Pat. No. 3,903,158, the disclosure of which is hereby incorporated by reference. Pharmaceutical grade urea which is free of biuret is also commercially available (National Diagnostics, Inc., 1013 Kennedy Boulevard, Nanville, N.J. 08835). In practice, urea which is free of biuret is also free of ammonia. In fact, the toxicity attributed as "urea toxicity syndrome" is believed to result as a consequence of ammonia activity.

Sorbitol is the second component of the food composition and is commercially available as a food grade ingredient. The composition preferably contains sorbitol at a molar ratio of sorbitol to urea ranging from about 0.5:1.0 to 2.0:1.0, and most preferably at a molar ratio of about one to one. The presence of sorbitol in these ratios functions to maximize the urea nitrogen retention in the consumer. In cases where there is an increase in endogenous or exogenous production of free radicals such as when stale partially oxidized polyunsaturated fats are included in a co-fed diet or the subject is in a state of increased anxiety, it may be desirable to include a higher than equal molar sorbitol to urea are not generally required unless it is intended that some of the urea may be employed as a diuretic.

The third component of the food composition is an edible anti-urease component. Preferred anti-urease compounds are included in the group consisting of acetylsalicylic acid, aluminum sulfate, aluminum chloride, aluminum potassium sulfate, aluminum sodium sulfate, aluminum acetate, cobalt chloride, cobalt gluconate, cobalt sulfate, Vitamin B-12, copper chloride, copper gluconate, copper sulfate, manganese chloride, manganese gluconate, manganese sulfate, zinc chloride, zinc gluconate and zinc sulfate. The anti-urease component is believed to increase the nitrogen forming efficiency of the edible dietary composition by preventing exocellular degradation of urea by bacterial ureases. Such ureases produce ammonia in the gastrointestinal tract with subsequent absorption of the ammonia into the blood stream. The incorporation of urease inhibitors into the food compositions functions to increase the level of blood urea nitrogen by preventing the wasteful exocellular hydrolysis of urea by free urease and can thus function to help prevent the occurrence of "urea toxicity syndrome."

The adequacy of the anti-urease component of the food composition may be determined according to the following method. A food composition according to the invention which contains 2.5 grams of urea (about 41,625 micromoles of urea) is dissolved in 500 ml of distilled water and is gently mixed by shaking with six (6) drops of a standard solution of glycerol and urease having about 38 international units of activity per drop. The concentration and activity of the anti-urease component is considered effective to prevent substantial exocellular degradation of the urea component in the gastrointestinal tract if the pH does not rise appreciably or to above 7.0 over the next six (6) hours.

The three part urea/sorbitol/anti-urease composition can be combined with one or more additional nutrient ingredients of a co-fed ration. Preferred nutrient ingredients include those which are known to be deficient in an ordinary diet. Such ingredients include phosphorus, zinc, copper and molybdenum. Phosphate may be provided by any of a number of edible phosphates including phosphoric acid, mono- and di- sodium phosphate and mono- and di-potassium phosphate. Other components can include colors, flavors and vitamins as might be desirable. Iron can also be added, although its addition as a nutrient ingredient may not be necessary as it is generally desired for purposes of protein synthesis that the total dietary intake of iron be about one-half that of zinc.

The food composition of the invention is stable and does not require refrigeration, freezing, drying, cooking or canning for preservation or consumption. Dry powder formulations may require packaging that protects the product from moisture, however. Such dry premixes are preferably dissolved in water before they are consumed.

The food composition of the invention may be advantageously combined with further additional components of a co-fed ration. In such a case, the co-fed ration (excluding the urea/sorbitol/anti-urease component food composition) should preferably contain less than 2.0 percent nitrogen on a dry matter basis. The urea containing food composition can then be added to the co-fed ration in an amount such that the total ration including the co-fed portion has a nitrogen content of about 2.0 percent by weight or greater which corresponds to a 12.5 percent protein equivalent on a dry matter basis. Because the food composition of the invention is intended according to one aspect of the invention as a supplement to protein consumption, the co-fed ration can itself be low in protein. Such co-fed diets would be known as "purposely low-protein diets." When the food composition of the invention is consumed as such, it should be consumed in a serving containing from 1 to 3 grams of urea. One gram of urea in such components provides the nitrogen equivalent of about 2.9 grams of protein.

The essential components of the urea/sorbitol/anti-urease food composition are preferably dissolved in sufficient aqueous liquid to ensure that all ingredients are completely dissolved or well-suspended prior to their consumption. The pH of the food composition should preferably be between about 2.5 and 7.0 with the pH most preferably between about pH 4 and pH 7.

The food compositions of the present invention are capable of assisting in alleviating protein malnutrition. Moreover, the food compositions have been discovered to provide a sensation of satiety and to suppress the appetite for food generally and for ethanol specifically. While the food compositions of the present invention are not represented to be a "cure" for alcohol dependency syndrome, they are believed to represent useful nutritional adjuncts to control craving for ethanol in the context of conventional treatment regimens. Accordingly, the invention provides methods for suppressing appetite for ethanol in humans comprising administering an amount of a food composition comprising urea, sorbitol and an edible anti-urease component effective to suppress the subject's appetite for alcohol. The edible food compositions are typically administered at a rate such that greater than about 3 grams of urea is administered per day, but greater or lesser amounts may be administered depending on the effectiveness of such an amount.

The invention also provides a method for suppressing appetite generally comprising administering an amount of a food composition comprising urea, sorbitol and an anti-urease component effective to suppress appetite for food generally.

While not wishing to be limited by any particular theory of the invention, it is believed that the food compositions function by satisfying the craving of the body for food generally and for ethanol specifically which results from an absence of available nitrogen. Specifically, it is believed that the urea functions with the sorbitol to supply necessary nitrogen for amino acid and hence protein formation. Moreover, by providing nitrogen for amino acid biosynthesis and thereby using up reducing equivalents of hydrogen, urea itself may ameliorate the metabolic abnormalities associated with the altered redox state induced by ethanol oxidation. This role of urea may help account for the observed low levels of blood urea nitrogen (BUN) typical in chronic alcoholics suffering from alcohol dependence syndrome, although the diagnosis of inadequate urea has not hitherto been made, nor has supplemental dietary urea to ameliorate this condition hitherto been prescribed. In addition, the presence of sorbitol in the food composition of the invention is believed to provide reduced NADH which can provide donatable hydrogen useful in the detoxification of oxygen free radicals which are associated with alcohol dependence syndrome.

Urea metabolism via the mechanism of the invention begins with hydrolysis of urea via intracellular urease to form ammonium carbamate. The mechanism for this process is believed to be related to the Bjorksten process for urea utilization shown below.

Urea hydrolysis by urease (inside the cell):

$$H_2O + NH_2-CO-NH_2 \xrightarrow{\text{(endocellular urease)}}$$

Water   Urea $$NH_4O-CO-NH_2$$

Ammonium carbamate

Bjorksten Process:

$$NH_4O-CO-NH_2 \longrightarrow NH_4O-C(OH)=NH$$

Ammonium carbamate      "Enol" form

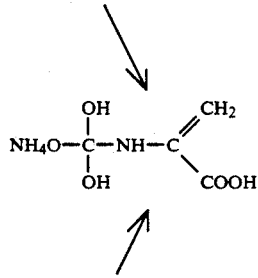

$$CH_3-CO-COOH \longrightarrow CH_2=C(OH)-COOH \longrightarrow$$

Pyruvate      "Enol" form $$NH_4O-COOH + CH_2=C(NH_2)-COOH$$

Ammonium bicarbonate      Aminoacrylic acid

See, Bjorksten, J., Zur Kenntnis der Synthese von Eiweibstoffen und ihrer Bausteine bei höhereb Pflanzen (Studies on the Synthesis of Proteins and their Building Stones in Higher Plants) Biochemische Zeitschrift, 1930; Bjorksten, J. & Himberg, I., Spielt Ammoniak eine direkte Rolle bei der EiweiBsynthese höherer Pflanzen (Does Ammonia play a direct role in Protein Synthesis of Higher Plants?) Biochemische Zeitschrift, 1930.

According to the Bjorksten process, the enol form of an acid amide such as ammonium carbamate and the enol form of pyruvate condense to form an unstable intermediate which then decomposes to yield aminoacrylic acid and another molecule such as ammonium bicarbonate. The aminoacrylic acid is then believed to be capable of reacting with a variety of adducts to yield a variety of amino acids. For example, the aminoacrylic acid can condense with dioxygen to produce glycine and carbon dioxide, or with water to produce serine or with hydrogen to produce alanine as shown below.

$$C_3H_5NO_2 + O_2 \longrightarrow C_2H_5NO_2 + CO_2$$

Aminoacrylic acid   Dioxygen   Glycine and Carbon Dioxide

-continued $$C_3H_5NO_2 + H_2O \longrightarrow C_3H_7NO_3$$

Aminoacrylic acid   Water   Serine $$C_3H_5NO_2 + H_2 \longrightarrow C_3H_7NO_2$$

Aminoacrylic acid   Hydrogen   Alanine

Retention of one of the two urea nitrogen atoms is thus achieved directly via formation of amino acids from aminoacrylic acid. Thereafter, it is believed that the presence of adequate "reducing equivalents" can make reduced NADH available and that the other urea nitrogen atom located in the ammonium bicarbonate product of the Bjorksten process can thus be used for amino acid synthesis. This use is via the synthesis of glutamate from the ammonium ion and a keto acid mediated by the glutamate dehydrogenase enzyme as shown below.

$$HOOC-(CH_2)_2-\overset{O}{\underset{\|}{C}}-COO^- + H^+ +$$

alpha-ketoglutarate $$NADH + NH_4^+ \xrightarrow{\text{(glutamate dehydrogenase)}}$$

ammonium ion $$HOOC-(CH_2)_2-\overset{NH_2}{\underset{|}{CH}}-COOH + NAD + H_2O$$

L-glutamate

Alternatively, it is believed that the metabolism of the urea nitrogen in ammonium bicarbonate ($NH_4^+ + HCO_3^-$) can be by way of its reintroduction into urea by means of Krebs-Henseleit Cycle mechanisms as shown below.

Mitochondrial carbamyl phosphate synthetase I:

$$(NH_4 + HCO_3^-) + 2 ATP + N\text{-acetylglutamate} \xrightarrow{(Mg^{+2})}$$

Carbamyl phosphate + 2 ADP + $P_i$

Ornithine carbamyl transferase:

$$\text{Carbamyl phosphate} + \text{L-Ornithine} \xrightarrow{(Mg^{+2})} \text{Citrulline} + P_i$$

Argininosuccinate synthetase:

$$\text{L-Aspartate} + \text{L-Citrulline} + ATP \xrightarrow{(Mg^{+2})}$$

L-Argininosuccinate + AMP + PP

Agrininosuccinate lyase:

$$\text{L-Argininosuccinate} \longrightarrow \text{Fumarate} + \text{L-Arginine}$$

Arginase:

$$\text{L-Arginine} + H_2O \xrightarrow{(Mn^{+2})} \text{L-Ornithine} + \text{Urea}$$

It is believed that sorbitol functions in the food composition of the invention as a hydrogen donor so as to make reduced NADH available. This reduced NADH is thus available to participate in the synthesis of glutamate from ammonium ions. While ethanol also acts as a hydrogen donor, the sorbitol molecule itself supplies not only the needed hydrogen atoms, but also a useful sugar compound. Moreover, ethanol is a generator of toxic oxygen radicals.

The following examples show methods of producing the food compositions of the invention and methods of using the compositions to suppress the appetite of human subjects for ethanol or for food generally.

EXAMPLE 1

In this example, six food composition mixes according to the invention were prepared by blending the following combinations of ingredients.

| Ingredients | Parts by Weight |
|---|---|
| *Example 1A* | |
| Biuret-Negative UREA (46.65% N) | 10.000 |
| Sorbitol | 30.300 |
| Sucrose | 28.500 |
| Aluminum Sulfate, hydrate (8.1% Al) | 0.600 |
| Sodium phosphate, monobasic (22.4% P) | 3.000 |
| Zinc sulfate, heptahydrate | 0.280 |
| Copper sulfate, pentahydrate | 0.010 |
| Sodium molybdate, dihydrate | 0.001 |
| Vitamin B-12, 1000 mcg/cc | 0.010 |
| Flavor, Color, Citric Acid | 17.299 |
| TOTAL | 90.000 |
| *Example 1B* | |
| Biuret-Negative UREA (46.65% N) | 10.000 |
| Sorbitol | 15.200 |
| Sucrose | 43.600 |
| Aluminum Sulfate, hydrate (8.1% Al) | 0.600 |
| Sodium phosphate, monobasic (22.4% P) | 3.000 |
| Zinc sulfate, heptahydrate | 0.280 |
| Copper sulfate, pentahydrate | 0.010 |
| Sodium molybdate, dihydrate | 0.001 |
| Vitamin B-12, 1000 mcg/cc | 0.010 |
| Flavor, Color, Citric Acid | 17.299 |
| TOTAL | 90.000 |
| *Example 1C* | |
| Biuret-Negative UREA (46.65% N) | 10.000 |
| Sorbitol | 22.800 |
| Sucrose | 36.000 |
| Aluminum Sulfate, hydrate (8.1% Al) | 0.600 |
| Sodium phosphate, monobasic (22.4% P) | 3.000 |
| Zinc sulfate, heptahydrate | 0.280 |
| Copper sulfate, pentahydrate | 0.010 |
| Sodium molybdate, dihydrate | 0.001 |
| Vitamin B-12, 1000 mcg/cc | 0.010 |
| Flavor, Color, Citric Acid | 17.299 |
| TOTAL | 90.000 |
| *Example 1D* | |
| Biuret-Negative UREA (46.65% N) | 10.000 |
| Sorbitol | 44.600 |
| Sucrose | 14.200 |
| Aluminum Sulfate, hydrate (8.1% Al) | 0.600 |
| Sodium phosphate, monobasic (22.4% P) | 3.000 |
| Zinc sulfate, heptahydrate | 0.280 |
| Copper sulfate, pentahydrate | 0.010 |
| Sodium molybdate, dihydrate | 0.001 |
| Vitamin B-12, 1000 mcg/cc | 0.010 |
| Flavor, Color, Citric Acid | 17.299 |
| TOTAL | 90.000 |
| *Example 1E* | |
| Biuret-Negative UREA (46.65% N) | 10.000 |
| Sorbitol | 58.800 |
| Sucrose | 0.000 |
| Aluminum Sulfate, hydrate (8.1% Al) | 0.600 |
| Sodium phosphate, monobasic (22.4% P) | 3.000 |
| Zinc sulfate, heptahydrate | 0.280 |
| Copper sulfate, pentahydrate | 0.010 |
| Sodium molybdate, dihydrate | 0.001 |
| Vitamin B-12, 1000 mcg/cc | 0.010 |
| *-continued* | |
| Ingredients | Parts by Weight |
| Flavor, Color, Citric Acid | 17.299 |
| TOTAL | 90.000 |

To 90 grams of these five protoprotein food premixes, 400 grams of water was added to make five corresponding beverages. The beverages had a pH of about 2.6 and tasted slightly tart and slightly sweet.

The following examples show the utility of the urea/sorbitol/anti-urease compositions for suppressing the appetite of individuals for alcohol (Example 2) and for reducing appetite generally and providing an overall sense of well-being generally (Example 3).

EXAMPLE 2

According to this example, a urea/sorbitol/anti-urease food composition was prepared from the following table of ingredients.

| Ingredients | Parts by Weight |
|---|---|
| Biuret-Negative Urea (46.65% N) | 10.00 |
| Sorbitol | 30.00 |
| Aluminum Sulfate, hydrate (8.1% Al) | 1.00 |
| Sodium phosphate, monobasic (22.4% P) | 3.20 |
| Zinc sulfate, pentahydrate | 0.58 |
| Cupric sulfate | 0.02 |
| Flavor, Color, Citric Acid | 1.20 |
| Water | 54.00 |
| TOTAL | 100.00 |

The ingredients were mixed in dry form in a laboratory mill mixer with the more minor ingredients mixed first followed by the more major ingredients. The dry ingredients were then dissolved into the water to provide a beverage which was administered orally to the test subjects.

Subject A was classified as a "heavy" drinker of alcoholic beverages. Over the period of about a month, Subject A consumed one or two servings per day (each serving contained about 3 grams of urea) of the food composition prepared above and was able to reduce his consumption of alcoholic beverages to a "moderate" level. After subject A consumed the last of the batch of the food composition describe above which included USP grade urea, he continued to consume a similar batch which contained a lower grade Feed grade urea. The Feed grade urea was reported to have less of an "appeal" to the subject and he stopped consuming it because of a bad aftertaste which might have been associated with impurities such as bentonite in the urea. Sometime later, Subject A resumed consuming a new batch of the original composition comprising the USP grade urea and reported that the preparation was "very satisfying" and had a better taste than that comprising the Feed grade urea.

Subject B was classified as being alcohol dependent at a time when he was undergoing serious personal stress. The subject consumed the food composition prepared as above and reported that the food was helpful in eliminating his craving for alcohol. However, after a period of time, the subject quit consuming the food composition, possibly because his supply was exhausted, and his alcohol dependency resumed.

Individual C consumed a single serving of the food composition prepared as above while present in a bar after the end of the work day. The subject reported that he experienced a profound effect of "satiety," which he felt so strongly that he had no appetite for alcoholic beverages which he usually consumed after work. The subject did not consume any alcohol that evening, and reported that he slept very well.

Individual D consumed a single serving of the food composition prepared as above prior to attending a social gathering at which alcoholic beverages were consumed by all others present. The subject reported that she did not have any appetite or interest in drinking that evening, even through she habitually would have consumed several alcoholic beverages.

EXAMPLE 3

This example relates to the use of the food compositions of the invention for use as an aid to dietetic weight loss.

Subject E used the food composition of Example 2 as well as product prepared by the second batch according to the invention to control his appetite. The subject was employed at a physically demanding job and consumed a normal breakfast and lunch. During the afternoon, however, when the subject was normally tempted to snack, the subject consumed a quantity of the food composition of the invention mixed with milk which he reported satisfied his appetite. The subject then consumed very little or nothing for supper. Following this regimen, the individual lost some 40 pounds over the course of several months. After losing this amount of weight, the subject continued to consume the food composition described above but returned to a normal food intake including a normal supper. The subject did not lose additional weight and eventually regained 10 pounds but reported a feeling of relaxation and bodily control during sports activities which he did not experience in the absence of consuming the urea/sorbitol/anti-urease food product.

Subject F consumed the food product of Example 2 on several occasions and reported a feeling of satiety that made her feel better generally.

Subject G consumed the food consumption of Example 2as well as product prepared by the second batch of that example on one occasion prior to exercising, and reported feeling better during the course of his exercise workout than normal and attributed this effect to the food composition.

Numerous modifications and variations in the practice of the invention are expected to occur to those skilled in the art upon consideration of the foregoing descriptions of the preferred embodiments thereof. Consequently, only such limitations should be placed on the invention as appear in the following claims.

We claim:

1. A method for alleviating protein malnutrition in a human comprising administering to said human an effective amount of a food composition comprising substantially biuret-free urea, sorbitol and a quantity of an edible anti-urease component effective to prevent substantial exocellular degradation of said urea wherein said sorbitol and said urea are present in a molar ratio of from about 0.5:1 to about 2.0:1.

2. The method according to claim 1 wherein said composition comprises water.

3. The method according to claim 1 wherein said anti-areas components is a member selected from the group consisting of acetylsalicylic acid, aluminum sulfate, aluminum chloride, aluminum potassium sulfate, aluminum sodium sulfate, aluminum acetate, cobalt chloride, cobalt gluconate, cobalt sulfate, Vitamin B-12, copper chloride, copper gluconate, copper sulfate, manganese chloride, manganese gluconate, manganese sulfate, zinc chloride, zinc gluconate and zinc sulfate.

4. The method according to claim 1 wherein said food composition is administered at a rate such that at least 3 grams of urea is administered per day.

5. A food composition for human consumption comprising substantially biuret-free urea, sorbitol and a quantity of an edible anti-urease component effective to prevent substantial exocellular degradation of said urea wherein said sorbitol and urea are present in a molar ratio of from about 0.5:1 to about 2.0:1.

6. The method according to claim 5 wherein the composition comprises water.

7. The method according to claim 5 wherein said edible anti-urease component is selected from the group consisting of acetylsalicylic acid, aluminum sulfate, aluminum chloride, aluminum potassium sulfate, aluminum sodium sulfate, aluminum acetate, cobalt chloride, cobalt gluconate, cobalt sulfate, Vitamin B-12, copper chloride, copper gluconate, copper sulfate, manganese chloride, manganese gluconate, manganese sulfate, zinc chloride, zinc gluconate and zinc sulfate.

8. A food composition according to claim 5 further comprising one or more additional nutrient ingredients such that said food composition has a nitrogen content of about 2.0 percent by weight or greater.

* * * * *

UNITED STATES PATENT AND TRADEMARK OFFICE
CERTIFICATE OF CORRECTION

PATENT NO. : 5,200,211

DATED : April 6, 1993

INVENTOR(S) : Anderson et al.

It is certified that error appears in the above-identified patent and that said Letters Patent is hereby corrected as shown below:

Column 2, line 51, "Nanville" should be --Manville--.

Column 2, lines 54-55, "activity" should be --toxicity--.

Column 2, line 68, after "molar" insert --proportion of sorbitol. Less than equal molar ratios of--.

Column 3, line 2, delete "may".

Column 6, line 58, "Agrininosuccinate" should be --Argininosuccinate--.

Column 9, line 11, "through" should be --though--.

Column 9, line 42, "2as" should be --2 as--.

Column 10, line 16, "anti-areas" should be --anti-urease--.

UNITED STATES PATENT AND TRADEMARK OFFICE
CERTIFICATE OF CORRECTION

PATENT NO. : 5,200,211

DATED : April 6, 1993

INVENTOR(S) : Anderson et al.

It is certified that error appears in the above-identified patent and that said Letters Patent is hereby corrected as shown below:

Column 10, line 16, "components" should be --component--.

Column 10, line 33, "method" should be --food composition--.

Column 10, line 35, "method" should be --food composition--.

Signed and Sealed this

Sixth Day of September, 1994

Attest:

BRUCE LEHMAN

Attesting Officer

Commissioner of Patents and Trademarks